H. SINCLAIR.
Machine for Removing and Melting Snow.
No. 197,905. Patented Dec. 4, 1877.
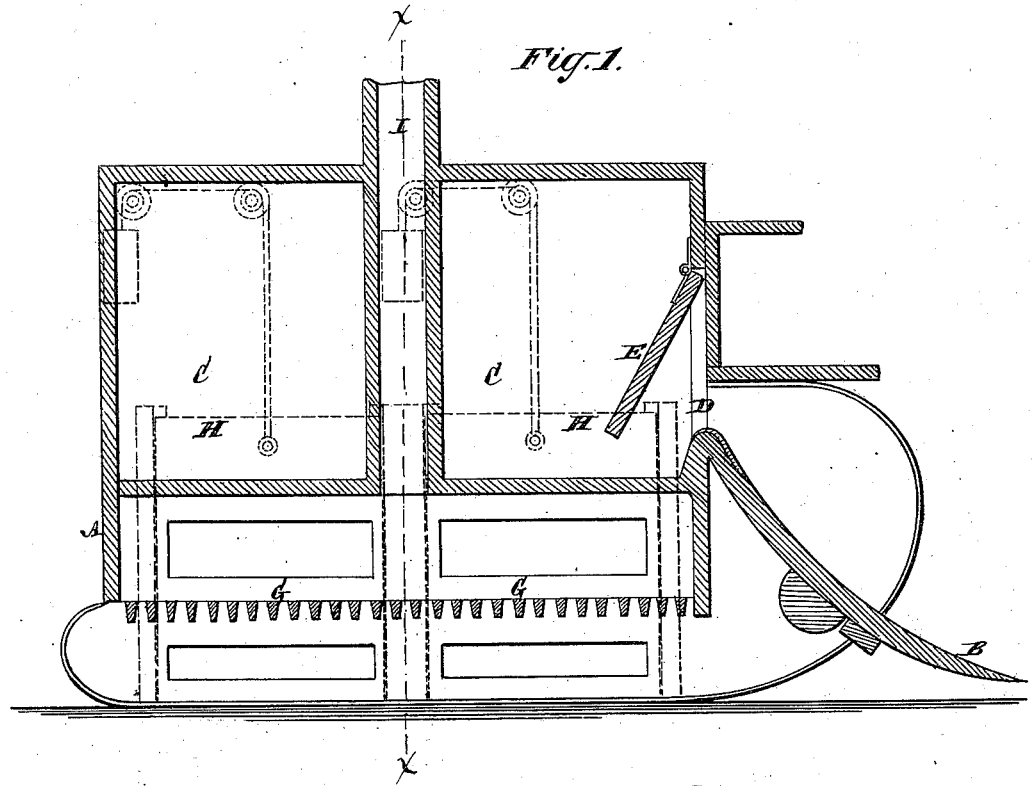
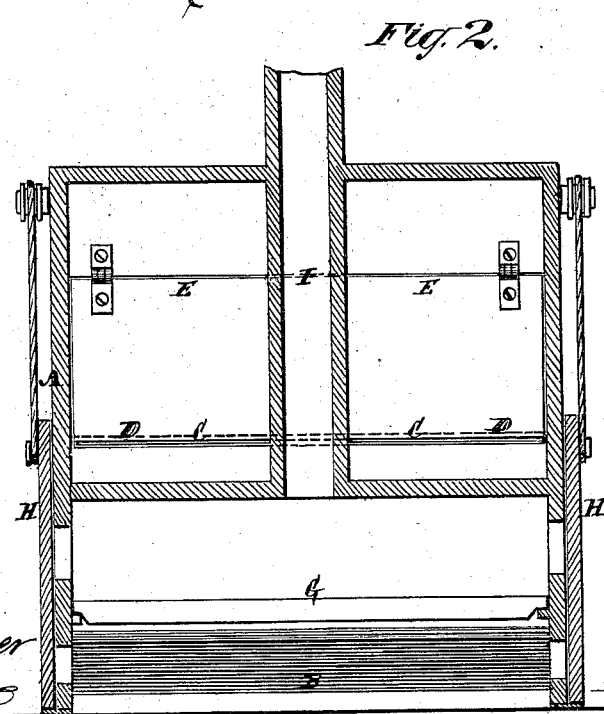
Witnesses.
John Becker
Fred Haynes
Inventor
Hector Sinclair
by his Attorneys Brown & Allen

UNITED STATES PATENT OFFICE.

HECTOR SINCLAIR, OF GREENWICH, CONNECTICUT.

IMPROVEMENT IN MACHINES FOR REMOVING AND MELTING SNOW.

Specification forming part of Letters Patent No. 197,905, dated December 4, 1877; application filed October 10, 1877.

*To all whom it may concern:*

Be it known that I, HECTOR SINCLAIR, of Greenwich, in the county of Fairfield and State of Connecticut, have invented certain new and useful Improvements in Machines for Removing and Melting Snow, of which the following is a description, reference being had to the accompanying drawing, forming part of this specification.

This invention is more particularly designed to be applied to machines for removing snow from streets and railroad-tracks, and for melting the snow as removed.

The invention consists in certain novel combinations of parts or devices, including a shovel for taking up the snow, a tank for receiving the latter, a furnace for melting the snow in the tank, and an overflow-opening, arranged to pass off the water resulting from the melted snow over and down the shovel, and whereby the shovel is not only kept clear but warm, which facilitates its sliding or digging into the snow on the surface to be cleared.

Figure 1 represents a centrally longitudinal vertical section of a machine for removing and melting snow, constructed in accordance with my invention; and Fig. 2 a transverse section of the same.

The framing A of the machine may be of any suitable construction, and the machine either be mounted upon runners or upon wheels, as circumstances render most desirable.

When the machine is designed to clear railway-tracks of snow, then it should be mounted upon wheels of the same gage as the track, and the shovel B, with which it is fitted in front, may bear on the rails. The means for drawing or forcing the machine over the ground are not shown, as they do not form any part of this invention.

The shovel B extends across the whole width of the machine, or thereabout, and inclines downwardly in a forward direction. Said shovel may either be a fixed one, or it may be hinged or jointed, to enable it to lift or be lifted to adapt it to the surface of the ground, or to set it as close as may be desired to the ground.

As the machine is moved forward the shovel B slides or digs into the snow, and lifts or passes the latter up over it, and causes the snow, or snow and ice, to be delivered into a tank, C, in the rear of the shovel, and occupying an elevated position throughout the whole or greater part of the body of the machine. This tank C is a close one, but is provided with an opening, D, in front, arranged intermediately of its height, immediately above the upper edge of the shovel, and extending throughout the width of the shovel, or nearly so. Said opening, which serves to admit of the snow being delivered by the shovel into the tank, constitutes an overflow-opening for the water which results from the melting of the snow in the tank.

An upper hinged drop door or gate, E, may be fitted in the tank to close the opening D when heating the tank prior to commencing work, and, on being partially raised, to prevent floating or piled snow in the tank from passing back or out through the overflow-opening D.

The snow, as deposited in the tank, is melted through a direct application of heat to the tank and its contents by means of a furnace, G, extending under the tank C, and provided with any number of side doors, H, for charging it and regulating the draft.

The chimney I from this furnace is projected up through the tank and snow therein, whereby a large amount of additional heat is brought to bear upon said snow to melt it. In this capacity, the chimney I forms a radiator, extending up from the bottom of the tank into the body thereof, to constitute a heating-surface within the mass of snow in the tank. There may also be additional radiators, similarly extending up from the bottom of the tank into the body thereof, but closed at top, to similarly act upon the snow in the tank.

By the arrangement, as herein shown and described, of the overflow-opening D, relatively to the tank C and shovel B, an overflow of warm water, resulting from the melting of the snow, is kept up over the upper edge and down the shovel, whereby the latter is not only kept clear and free of adhering snow or ice, but warm, which facilitates its sliding easily into the snow on the surface to be cleared.

I claim—

1. The combination of shovel B, close tank C, having front overflow-opening D, and furnace G, all so arranged that the snow will be forced up the incline of the shovel, fall therefrom into the tank, be there melted by direct heat from the furnace, overflow and run down the shovel in the form of water, as and for the purpose set forth.

2. In a snow melting and removing machine, the combination of a snow-shovel, snow and water tank, and a furnace, all so arranged that snow will fall from the top of the shovel into said tank, and be there melted by the direct heat of the furnace.

3. The drop door or gate E, in combination with the tank C, having an overflow-opening, D, and the shovel B, arranged as described.

4. A machine for melting snow, provided with a shovel and with a tank for receiving and melting the snow lifted by the shovel, having its parts organized so that one and the same opening serves to pass the snow into the tank and to provide for the overflow of warm water therefrom over and down the shovel, substantially as specified.

HECTOR SINCLAIR.

Witnesses:
HENRY T. BROWN,
FRED. HAYNES.